United States Patent
Kitamura

(10) Patent No.: US 7,853,086 B2
(45) Date of Patent: Dec. 14, 2010

(54) FACE DETECTION METHOD, DEVICE AND PROGRAM

(75) Inventor: Yoshiro Kitamura, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 997 days.

(21) Appl. No.: 11/655,847

(22) Filed: Jan. 22, 2007

(65) Prior Publication Data

US 2007/0172126 A1   Jul. 26, 2007

(30) Foreign Application Priority Data

Jan. 23, 2006   (JP)   ............... 2006-013720

(51) Int. Cl.
  *G06K 9/62*   (2006.01)
  *G06K 9/00*   (2006.01)
(52) U.S. Cl. ...................... 382/224; 382/118
(58) Field of Classification Search .................. 382/224, 382/118, 160
See application file for complete search history.

(56) References Cited

U.S. PATENT DOCUMENTS

| | | | |
|---|---|---|---|
| 6,879,709 B2 * | 4/2005 | Tian et al. .................... 382/118 |
| 7,508,979 B2 * | 3/2009 | Comaniciu et al. ........... 382/154 |
| 7,657,085 B2 * | 2/2010 | Sabe et al. .................... 382/159 |
| 2001/0053292 A1 * | 12/2001 | Nakamura ................... 396/661 |
| 2002/0102024 A1 | 8/2002 | Jones et al. |
| 2003/0108244 A1 * | 6/2003 | Li et al. ....................... 382/227 |
| 2004/0179719 A1 * | 9/2004 | Chen et al. ................... 382/118 |
| 2004/0186816 A1 * | 9/2004 | Lienhart et al. ............... 706/20 |
| 2005/0100195 A1 * | 5/2005 | Li ................................ 382/118 |
| 2005/0144149 A1 * | 6/2005 | Li et al. ........................ 706/12 |
| 2006/0062451 A1 * | 3/2006 | Li et al. ........................ 382/159 |
| 2007/0053563 A1 * | 3/2007 | Tu et al. ....................... 382/128 |
| 2007/0104374 A1 * | 5/2007 | Terakawa .................... 382/190 |

OTHER PUBLICATIONS

Shihong Lao et al., Meeting on Image Recognition and Understanding, pp. II271-II276, Jul. 2004.

* cited by examiner

*Primary Examiner*—Wenpeng Chen
(74) *Attorney, Agent, or Firm*—Birch, Stewart, Kolasch & Birch, LLP.

(57) ABSTRACT

To detect faces contained in an image with changing position, inclination and orientation of a face to be detected, an indicator value for each position, inclination and orientation is calculated, which indicates probability of a partial image at the position being a face image having the inclination and the orientation. Then, the partial images having the indicator values not less than a first threshold are extracted as candidates. When a predetermined evaluation value indicating reliability of a certain candidate having a predetermined inclination and a first orientation is not less than a predetermined threshold value, another candidate having the predetermined inclination and a second orientation is discriminated as being a true face. When the candidates having the indicator values not less than a second threshold are discriminated as being true faces, the second threshold is lowered for another candidate having the predetermined inclination and a second orientation for discrimination.

26 Claims, 14 Drawing Sheets

FACE DETECTION METHOD, DEVICE AND PROGRAM

BACKGROUND OF THE INVENTION

1. Field of the Invention

The present invention relates to a face detection method and a face detection device for detecting face images contained in digital images, as well as a program therefor.

2. Description of the Related Art

Conventionally, particularly in the fields of image correction, security system, and digital camera control, face detection methods for detecting faces contained in digital images have been studied and various face detection methods have been proposed. One of such methods is a face detection method in which a digital image is scanned using a sub-window and whether or not an image within the sub-window is a face image containing a face is sequentially determined using classifiers, to detect a face contained in the digital image (see, for example, "Fast Omni-Directional Face Detection", Shihong LAO et al., Meeting on image recognition and understanding (MIRU2004) pp. II271-II276, 2004, and U.S. Patent Application Publication No. 20020102024).

The face images includes frontal face images that mainly contain frontal faces with front orientation and side face images that mainly contain side faces with side orientation. The frontal face images and the side face images have different image features from each other. Therefore, in order to detect both of the frontal face images and the side face images from images subjected to detection, typically, separate classifiers are used for discriminating the frontal face images and discriminating the side face images. For example, the classifier for discriminating the frontal face images learns features of frontal faces using different sample images representing frontal faces, and the classifier for discriminating the side face images learns features of side faces using different sample images representing side faces.

However, in the above-described face detection method using the classifiers, if a non-face pattern, which has features similar to the features of a face, is present in an image to be detected, the non-face image may falsely be detected as being a face image. Particularly, since the side face is formed by smaller number of face parts than those forming the frontal face and has a smaller face area than that of the frontal face, quantities of features of the side face appearing in an image is small. In addition, the side face has a complicated contour. Further, it is necessary to detect both of left- and right-side faces. Therefore, false detection rates for the side face images tend to be higher than false detection rates for the frontal face images.

As described above, when faces contained in images are detected based on features of the faces in the images, there is at least a possibility of false detections, and therefore, it is desired to detect faces while minimizing a false detection rate. Further, since the false detection rate typically varies depending on the orientation of the face, it is desired to reduce the false detection rate for the orientations of faces that tend to result in high false detection rates.

SUMMARY OF THE INVENTION

In view of the above-described circumstances, the present invention is directed to provide a face detection method and a face detection device that can further reduce false detection of face images, as well as a program therefor.

A first aspect of the face detection method of the invention comprises: a face candidate extracting step for extracting face image candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and a discriminating step for discriminating whether or not the face image candidates are true face images, wherein, when a predetermined evaluation value indicating reliability of a certain face image candidate, among the face image candidates, having a predetermined inclination and a first orientation of the face is not less than a predetermined threshold value, the discriminating step discriminates another face image candidate, among the face image candidates, having substantially the same inclination as the predetermined inclination and a second orientation of the face as being a true face image.

A second aspect of the face detection method of the invention comprises: a face candidate extracting step for extracting face candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and a discriminating step for discriminating whether or not the face image candidates are true face images, wherein the discriminating step discriminates the face image candidates having the calculated indicator values not less than a second threshold value as being true face images from all the other extracted face image candidates, and when a predetermined evaluation value indicating reliability of a certain face image candidate, among the face image candidates, having a predetermined inclination and a first orientation of the face is not less than a predetermined threshold value, the discriminating step lowers the second threshold value for discrimination of another face image candidate, among the face image candidates, having substantially the same inclination as the predetermined inclination and a second orientation of the face.

A first aspect of the face detection device of the invention comprises: a face candidate extracting means for extracting face image candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and a discriminating means for discriminating whether or not the face image candidates are true face images, wherein, when a predetermined evaluation value indicating reliability of a certain face image candidate, among the face image candidates, having a predetermined inclination and a first orientation of the face is not less than a predetermined threshold value, the discriminating means discriminates another face image candidate, among the face image candidates, having substantially the same inclination as the predetermined inclination and a second orientation of the face as being a true face image.

A second aspect of the face detection device of the invention comprises: a face candidate extracting means for extracting face image candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and a discriminating means for discriminating whether or not the face image candidates are true face images, wherein the discriminating means discriminates the face image candidates having the calculated indicator values not less than a second threshold value as being true face images from all the other extracted face image candidates, and when a predetermined evaluation value indicating reliability of a certain face image candidate, among the face image candidates, having a predetermined inclination and a first orientation of the face is not less than a predetermined threshold value, the discriminating means lowers the second threshold value for discrimination of another face image candidate, among the face image candidates, having substantially the same inclination as the predetermined inclination and a second orientation of the face.

A first aspect of the program of the invention causes a computer to operate as a face detection device by causing the computer to operate as: a face candidate extracting means for extracting face image candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and a discriminating means for discriminating whether or not the face image candidates are true face images, wherein, when a predetermined evaluation value indicating reliability of a certain face image candidate, among the face image candidates, having a predetermined inclination and a first orientation of the face is not less than a predetermined threshold value, the discriminating means discriminates another face image candidate, among the face image candidates, having substantially the same inclination as the predetermined inclination and a second orientation of the face as being a true face image.

A second aspect of the program of the invention causes a computer to operate as a face detection device by causing the computer to operate as: a face candidate extracting means for extracting face image candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and a discriminating means for discriminating whether or not the face image candidates are true face images, wherein the discriminating means discriminates the face image candidates having the calculated indicator values not less than a second threshold value as being true face images from all the other extracted face image candidates, and when a predetermined evaluation value indicating reliability of a certain face image candidate, among the face image candidates, having a predetermined inclination and a first orientation of the face is not less than a predetermined threshold value, the discriminating means lowers the second threshold value for discrimination of another face image candidate, among the face image candidates, having substantially the same inclination as the predetermined inclination and a second orientation of the face.

In the present invention, the "inclination of the face" refers to an inclination in a so-called in-plane direction, i.e., a rotational position of the face in the image. Further, the "orientation of the face" refers to an orientation in a so-called out-plane direction, i.e., an orientation of the face such as, for example, a frontal face, a right-side face or a left-side face.

Moreover, "substantially the same inclination as the predetermined inclination" refers, for example, to an angle within a range of ±15 degrees from the predetermined inclination.

In the invention, the evaluation value may be a number of the face image candidates having the first orientation of the face, and the predetermined threshold value may be an integer of 2 or more.

Further, the evaluation value may be a total sum of the indicator values of the face image candidates having the first orientation of the face.

Furthermore, the first orientation and the second orientation may be the same orientation. In this case, the first and second orientations may include a plurality of different orientations.

In addition, the first orientation maybe a front orientation, and the second orientation may be a side or oblique orientation.

In the invention, the indicator values may be calculated by classifiers that have learned features of faces through a machine learning process using different sample images that represent faces having predetermined orientations and inclinations.

The machine learning process may, for example, involve boosting or neural network.

DESCRIPTION OF THE PREFERRED EMBODIMENTS

Hereinafter, an embodiment of the present invention will be described in detail with reference to the drawings.

Figure 1:
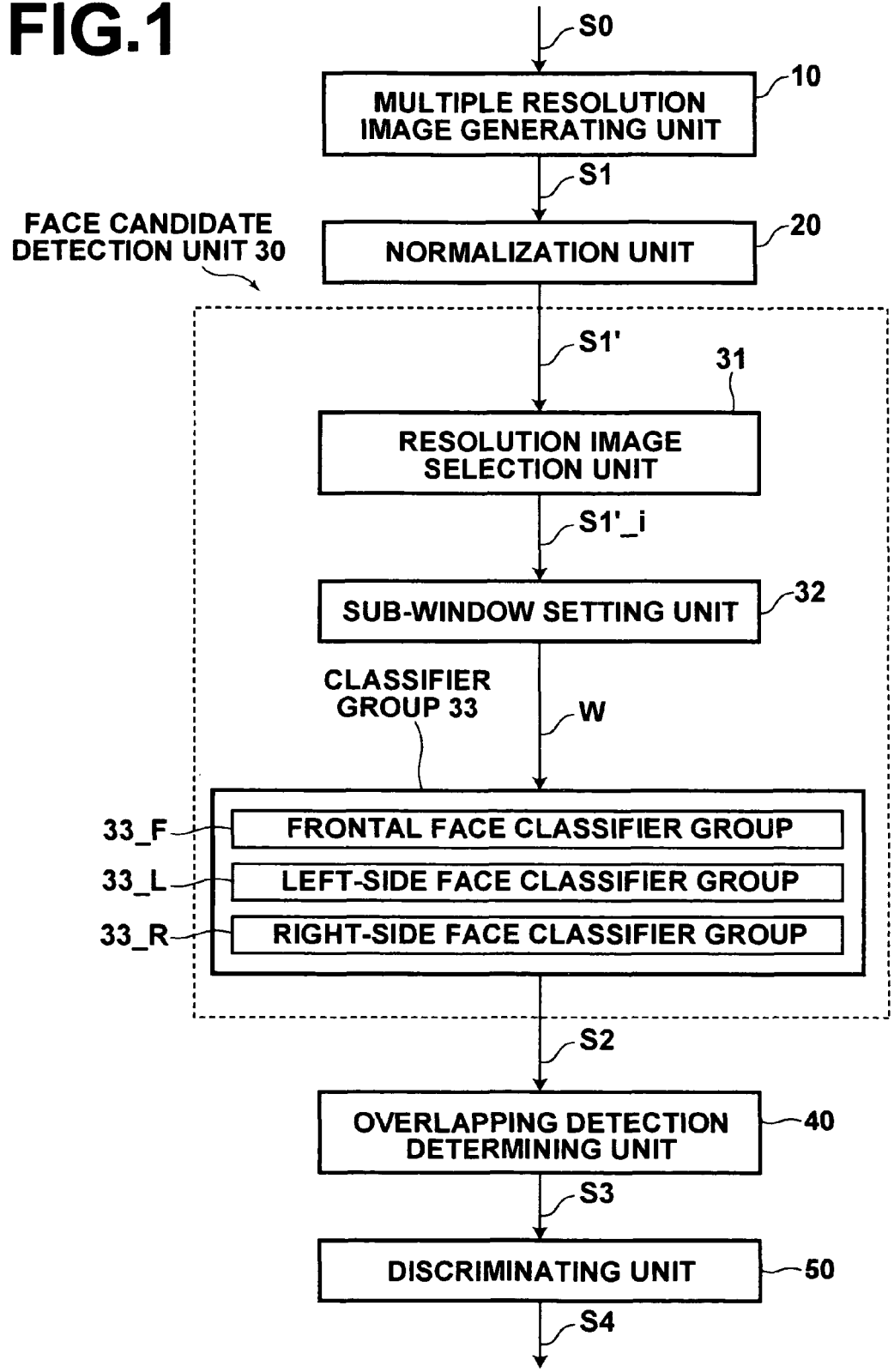
FIG. 1 is a block diagram illustrating the configuration of a face detection system.

FIG. 1 is a schematic block diagram illustrating the configuration of a face detection system 1 according to an embodiment of the invention. The face detection system 1 detects frontal face images containing frontal faces and side face images containing side faces (hereinafter may simply be referred to as face images) in digital images regardless of the positions, sizes, and inclinations (inclinations in the in-plane direction) of the faces. The face detection system 1 employs a face detection technique which has been deemed particularly excellent in detection accuracy and robustness, namely, a technique that uses a classifier module (hereinafter simply referred to as a classifier) generated through a machine learning process using sample images. In this technique, first, classifiers, each of which can discriminate whether or not a certain image is a face image containing a face having predetermined inclination and orientation, are generated through learning of features of faces using face sample image groups each formed by different face sample images representing faces having substantially uniform inclination and orientation and a non-face sample image group formed by different non-face sample images that are known not to be faces. Then, partial images are sequentially cut out from an image subjected to the face image detection (hereinafter referred to as an image subjected to detection). Thereafter, whether or not each partial image is a face image is determined using the classifiers to detect a face image in the image subjected to detection.

As shown in FIG. 1, the face detection system 1 includes a multiple resolution image generating unit 10, a normalization unit 20, a face candidate detection unit 30, an overlapping detection determining unit 40 and a discriminating unit 50. The face candidate detection unit 30 further includes a resolution image selection unit 31, a sub-window setting unit 32 and a classifier group 33.

The multiple resolution image generating unit 10 applies multiple resolution conversion to an inputted image S0 subjected to the face detection to obtain a resolution image group S1 formed by multiple images having different resolutions (S1_1, S1_2, . . . , and S1_n; hereinafter referred to as resolution images). Namely, the multiple resolution image generating unit 10 converts the resolution (image size) of the inputted image S0 to standardize the resolution to a predetermined resolution, for example, a resolution corresponding to a rectangular image having a size of 416 pixels for the short side thereof, to obtain a standardized inputted image S0'. Then, further resolution conversions are performed based on the standardized inputted image S0' to generate resolution images having different resolutions, thereby obtaining the resolution image group S1.

The reason for generating such a resolution image group is as follows. Usually, sizes of faces contained in the inputted images are unknown. On the other hand, the sizes (image sizes) of faces to be detected are uniform due to a process of generating the classifier, which will be described later. Therefore, in order to detect faces which may have sizes different from the uniform size in the inputted images S0, it is necessary to cut out partial images having a predetermined size at different positions in the images having different resolutions, and determine for each partial image whether or not the partial image is the face image.

Figure 2:
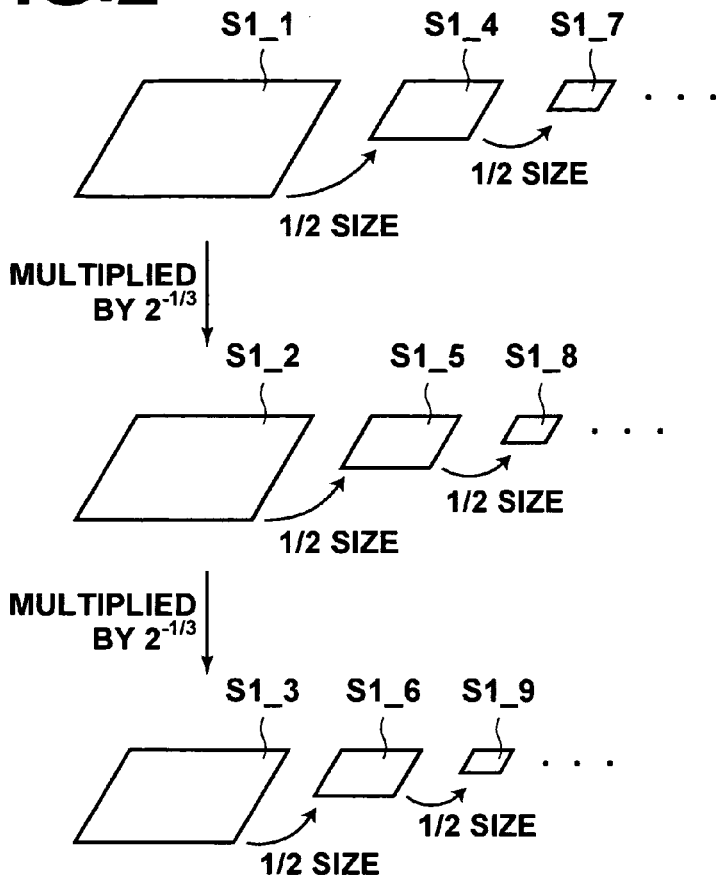
FIG. 2 illustrates steps of multiple resolution conversion of an inputted image.

FIG. 2 illustrates steps for applying the multiple resolution conversion to the inputted image. As shown in FIG. 2, in the multiple resolution conversion, i.e., generation of the resolution image group, specifically, the standardized inputted image S0' is set as a resolution image S1_1, which is a base image for the multiple resolution conversion. Then, a resolution image S1_2 having a size of $2^{-1/3}$ times the size of the resolution image S1_1 and a resolution image S1_3 having a size of $2^{-1/3}$ times the size of the resolution image S1_2 (a size of $2^{-2/3}$ times the size of the base image S1_1) are generated. Thereafter, resolution images respectively having reduced sizes of ½ of the resolution images S1_1, S1_2 and S1_3 are generated. Then, resolution images respectively having sizes of ½ of the previously generated size-reduced resolution images are generated. This operation is repeated to generate a predetermined number of resolution images. In this manner, images having sizes reduced by a decrement of $2^{-1/3}$ times can be generated from the base resolution image at high speeds using mainly the size reduction processing into ½ sizes without necessitating interpolation on pixel values representing luminance. For example, if the resolution image S1_1 has a rectangular size of 416 pixels for the short side thereof, the resolution images S1_2, S1_3, . . . , and the like, respectively have rectangular sizes of 330 pixels, 262 pixels, 208 pixels, 165 pixels, 131 pixels, 104 pixels, 82 pixels, 65 pixel, . . . , and the like, for short sides thereof. Thus the resolution images having the sizes reduced by a decrement of $2^{-1/3}$ times can be generated. It should be noted that the images generated in this manner without interpolation of pixel values tend to bear the features of the original image pattern, and therefore, are expected to improve accuracy of the face detection process.

The normalization unit 20 applies global normalization processing and local normalization processing to each of the resolution images so that the resolution images have the contrast suitable for the face detection process that is performed later, and obtains a resolution image group S1' formed by normalized resolution images (S1'_1, S1'_2, . . . , and S1'_n).

First, the global normalization processing is explained. The global normalization processing converts the pixel values of the entire resolution image according to a conversion curve that converts the pixel values of the entire resolution image closer to values representing logarithms of the luminance of the subject in the image, so that the contrast of the resolution image approaches to a predetermined level that is suitable for the face detection process, i.e., a level suitable for ensuring performance of the later-described classifier.

Figure 3:
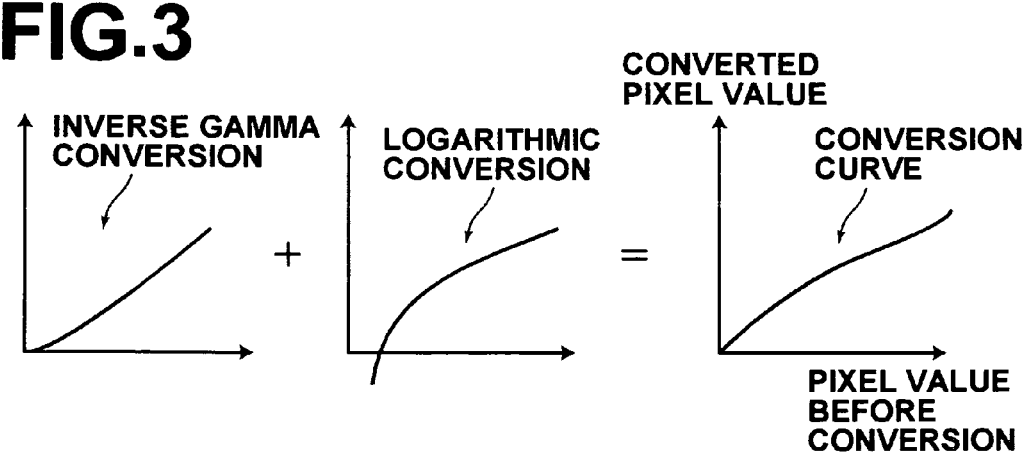
FIG. 3 illustrates an example of a conversion curve used in global normalization processing.

FIG. 3 illustrates one example of the conversion curve used in the global normalization processing. The global normalization processing may, for example, be processing where the pixel values are subjected to so-called inverse gamma conversion in the sRGB color space (i.e., raised to the power of 2.2) as shown in FIG. 3, and then, the pixel values of the entire image are converted according to the conversion curve (a lookup table) that plots logarithmic values this is because of the following reason.

A light intensity I, which is observed as an image, is usually expressed as a product of a reflectance R of a subject multiplied by an intensity of a light source L (I=R×L). Therefore, when the intensity of light source L changes, the light intensity I observed as the image also changes. Here, if evaluation of only the reflectance R of the subject can be performed, highly accurate face discrimination can be achieved that is independent from the intensity of the light source L, i.e., that is not influenced by the lightness of the image.

Assuming that the intensity of the light source is L, a light intensity I1 is observed at an area having a reflectance R1 on the subject, and a light intensity I2 is observed at an area having a reflectance R2 on the subject, then the following equation is established in a space plotting logarithmic values:

$$\log (I1) - \log (I2) = \log (R1 \times L) - \log (R2 \times L) = \log (R1) + \log (L) - (\log (R2) + \log (L)) = \log (R1) - \log (R2)$$
$$= \log (R1/R2)$$

That is, through the logarithmic conversion, the pixel values of the image are converted into a space where ratios of the reflectances are expressed as differences. In this space, only the reflectances of the subjects can be evaluated independently from the intensity of the light source L. In other words, the different levels of contrast (the differences between the pixel values in this case) of the images, which depend on the lightness of the respective images, can be converted into the same level.

On the other hand, images taken with typical imaging devices such as digital cameras are in the sRGB color space. The sRGB color space is an international standard with standardized color, saturation, and the like, for color reproduction by various imaging devices. In this color space, pixel values of an image are obtained by raising input luminance values to the power of $1/\gamma_{out}$ (=0.45) so that appropriate color reproduction can be obtained with an image output device with a gamma value ($\gamma_{out}$) of 2.2.

Therefore, by applying the so-called inverse gamma conversion to the pixel values of the entire image, i.e., raising the pixel values to the power of 2.2, and then converting the pixel values according to the conversion curve that plots logarithmic values, appropriate evaluation which is based only on the reflectance of the subject and independent from the intensity of the light source can be achieved.

The global normalization processing, as described above, can be said in other words to be processing that converts the pixel values of the entire image according to a conversion curve that converts a specific color space into another color space having different characteristics.

By applying this processing to the images subjected to detection, the contrast levels of the respective images that differ from each other depending on the lightness of the respective images can be converted into the same level, thereby improving accuracy of the face detection process. It should be noted that the results of the global normalization processing tend to be influenced by differences between the images subjected to detection due to lighting conditions such as oblique lighting, backgrounds and input modalities, however, the processing time thereof is short.

Next, the local normalization processing is explained. The local normalization processing reduces variation in the contrast between local areas in the resolution images. Namely, for each local area in the resolution images, if a degree of distribution of the pixel values representing the luminance of the local area is not less than a predetermined level, a first luminance scale conversion is applied to the local area to convert the degree of distribution close to a certain level that is higher than the predetermined level, and if the degree of distribution of the pixel values of the local area is lower than the predetermined level, a second luminance scale conversion is applied to the local area to convert the degree of distribution to a level lower than the certain level. It should be noted that the local normalization processing takes a long processing time, however, influence of differences between the images subjected to detection due to lighting conditions such as oblique lighting, backgrounds and input modalities on the results of discrimination is small.

Figure 4:
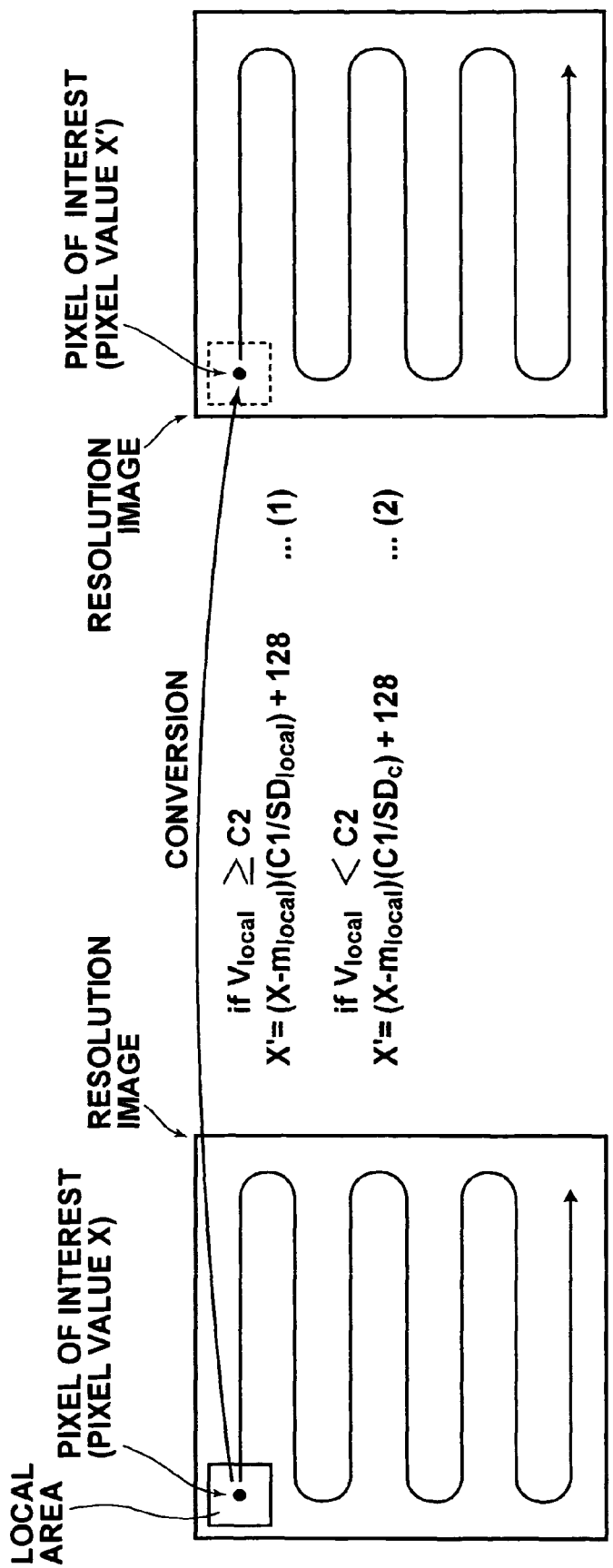
FIG. 4 illustrates the concept of local normalization processing.
Figure 5:
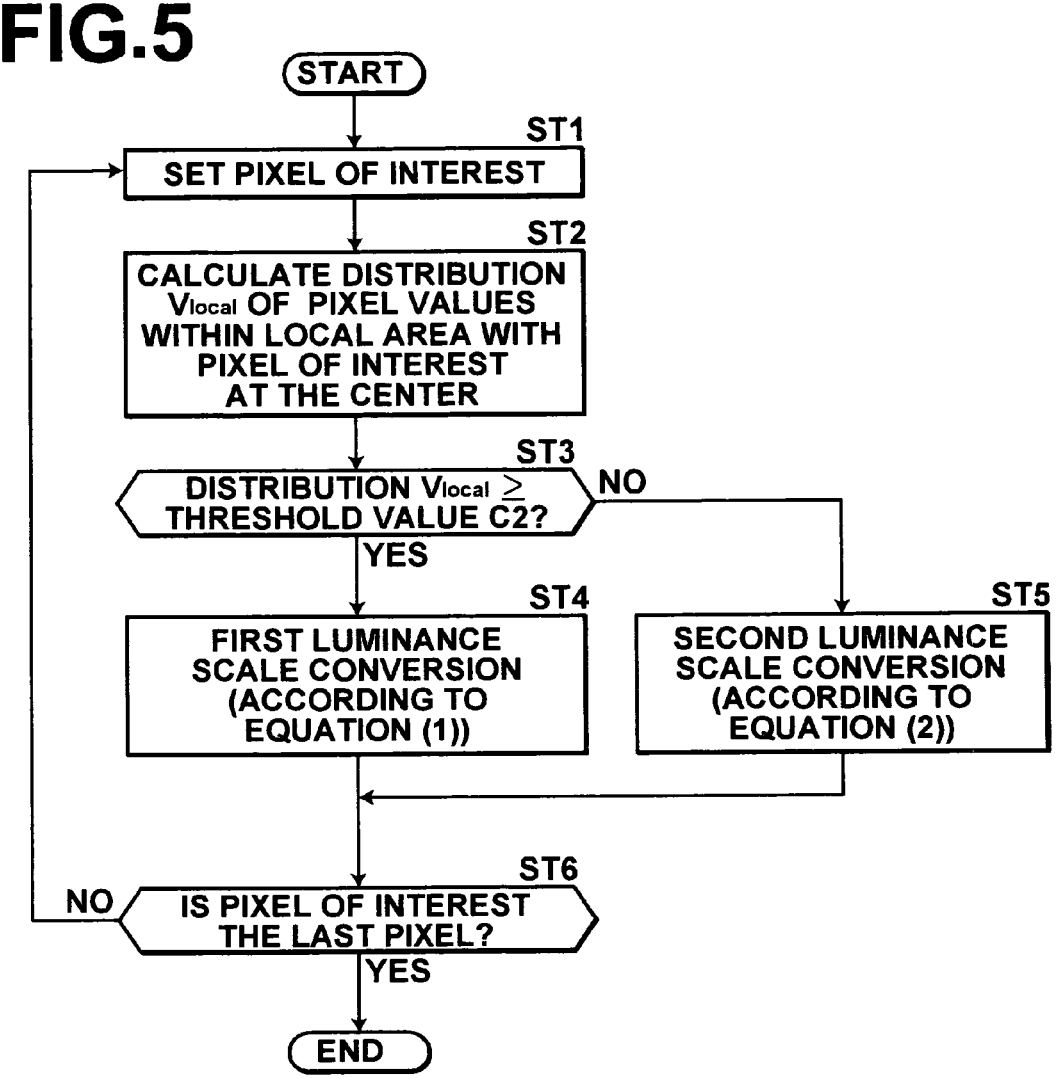
FIG. 5 is a flow chart of the local normalization processing.

FIG. 4 is a diagram illustrating the concept of the local normalization processing, and FIG. 5 illustrates the flow of the local normalization processing. Further, equations (1) and (2) represent the luminance scale conversion of the pixel values for the local normalization processing:

if $V_{local} \geq C2$ $$X' = (X - m_{local})(C1/SD_{local}) + 128 \quad (1)$$

if $V_{local} < C2$ $$X' = (X - m_{local})(C1/SD_C) + 128 \quad (2)$$

wherein X represents a pixel value of a pixel of interest, X' represents a converted pixel value of the pixel of interest, $m_{local}$ represents a mean of the pixel values within the local area with the pixel of interest at the center, $V_{local}$ represents a distribution of the pixel values within the local area, $SD_{local}$ represents a standard deviation of the pixel values within the local area, (C1×C1) is a reference value that corresponds to the above-described certain level, C2 represents a threshold value that corresponds to the above-described predetermined level, and $SD_C$ represents a predetermined constant. It should be noted that, in this embodiment, 8-bit luminance values are used for the luminance scale, and therefore, the pixel values may take numerical values ranging from 0 to 255.

As shown in FIG. 4 (and FIG. 5), first, one pixel in the partial image W2 is set as a pixel of interest (step ST1). Then, the distribution $V_{local}$ of the pixel values within the local area with the pixel of interest at the center, having a predetermined size (11×11 pixel size, for example), is calculated (step ST2). Then, whether or not the distribution $V_{local}$ is less than the threshold value C2 that corresponds to the predetermined level is determined (step ST3). If it is determined in step ST3 that the distribution $V_{local}$ is not less than the threshold value C2, then a luminance scale conversion according to equation (1) is carried out as the above-described first luminance scale conversion (step ST4), which reduces a difference between the pixel value X of the pixel of interest and the mean $m_{local}$ when the distribution $V_{local}$ is greater than the reference value (C1×C1) that corresponds to the certain level such that the larger the difference between the $V_{local}$ and the reference value (C1×C1), the smaller the difference between the pixel value X of the pixel of interest and the mean $m_{local}$, or increases the difference between the pixel value X of the pixel of interest and the mean $m_{local}$ when the distribution $m_{local}$ is smaller than the reference value (C1×C1) such that the larger the difference between the $m_{local}$ and the reference value (C1×C1), the larger the difference between the pixel value X of the pixel of interest and the mean $m_{local}$. On the other hand, if it is determined in step ST3 that the distribution $V_{local}$ is less than the threshold value C2, then a linear luminance scale conversion according to equation (2), which does not take the distribution $V_{local}$ into account, is carried out as the second luminance scale conversion (step ST5). Then, determination is made as to whether or not the pixel of interest set in step ST1 is the last pixel (step ST6). If it is determined in step ST6 that the pixel of interest is not the last pixel, the process returns to step ST1, where a next pixel in the same partial image is set as the pixel of interest. On the other hand, if it is determined in step ST6 that the pixel of interest is the last pixel, the local normalization process for that resolution image ends. By repeating the operations in steps ST1 to ST6, the local normalization is applied to the entire resolution image.

It should be noted that the predetermined level may vary depending on the entire or partial luminance of the local area.

For example, in the above-described normalization processing for carrying out the luminance scale conversion for each pixel of interest, the threshold value C2 may change depending on the pixel value of the pixel of interest. Namely, when the luminance of the pixel of interest is relatively high, a higher threshold value C2 corresponding to the predetermined level may be set, and when the luminance of the pixel of interest is relatively low, a lower threshold value C2 may be set. In this manner, even if a face is present at a low contrast (a state where the distribution of the pixel values is small) in a so-called dark area having low luminance values, the face can be correctly normalized.

It is assumed here that the inclination of the face to be detected is one of twelve inclination types that are set by rotating the face to be detected within the plane of the inputted image S0 by an increment of 30 degrees from the vertical direction of the inputted image S0, and an order of the inclinations of the face to be detected has been determined in advance as default setting. For example, the order may be expressed by clockwise rotational angles from the vertical direction of the inputted image S0, such that the upward inclinations includes three directions of 0 degree, 330 degrees and 30 degrees, the rightward inclinations includes three directions of 90 degrees, 60 degrees and 120 degrees, the leftward inclinations includes three directions of 270 degrees, 240 degrees and 300 degrees, and the downward inclinations includes three directions of 180 degrees, 150 degrees and 210 degrees, and the inclination of the face to be detected may be changed in this order.

The face candidate detection unit 30 applies the face detection process to each resolution image in the resolution image group S1' that has been normalized by the normalization unit 20, with changing the inclination of the face to be detected according to the preset order, to detect a predetermined number of face image candidates S2 contained in each resolution image. As described above, the face candidate detection unit 30 includes the resolution image selection unit 31, the sub-window setting unit 32 and the classifier group 33.

The resolution image selection unit 31 selects each resolution image in the resolution image group S1' sequentially in the order of the image size from the smallest (from the one having the roughest resolution), for the face detection process. It should be noted that the technique used for the face detection in this embodiment detects a face in the inputted image SO by determining, for each of partial images W which are sequentially cut out from the resolution images and having the same size, whether or not the partial image W is the face image. Therefore, the resolution image selection unit 31 sets the resolution images with changing the size of the face to be detected in the inputted image S0 for each time, and this can be regarded as the same as setting the resolution images in such an order that the size of the face to be detected changes from the largest to the smallest.

The sub-window setting unit 32 sets a sub-window for cutting out each partial image W, on which the discrimination as to whether or not it is the face image is to be made, from the resolution image selected by the resolution image selection unit 31 with shifting the position of the sub-window by a predetermined pitch for each time. For example, the sub-window for cutting out the partial images W having a predetermined size (i.e., 32×32 pixel size) is set on the selected resolution image, with being shifted by a predetermined number of pixels (for example, one pixel) to the next positions, and the cut out partial images W are sequentially inputted to the classifier group 33. As described later, each classifier forming the classifier group 33 carries out discrimination as to whether or not a certain image is a face image containing a face having predetermined inclination and orientation. This allows discrimination of faces having any orientation.

The classifier group 33 discriminates whether or not each partial image W cut out by the sub-window is a face image.

Figure 6:
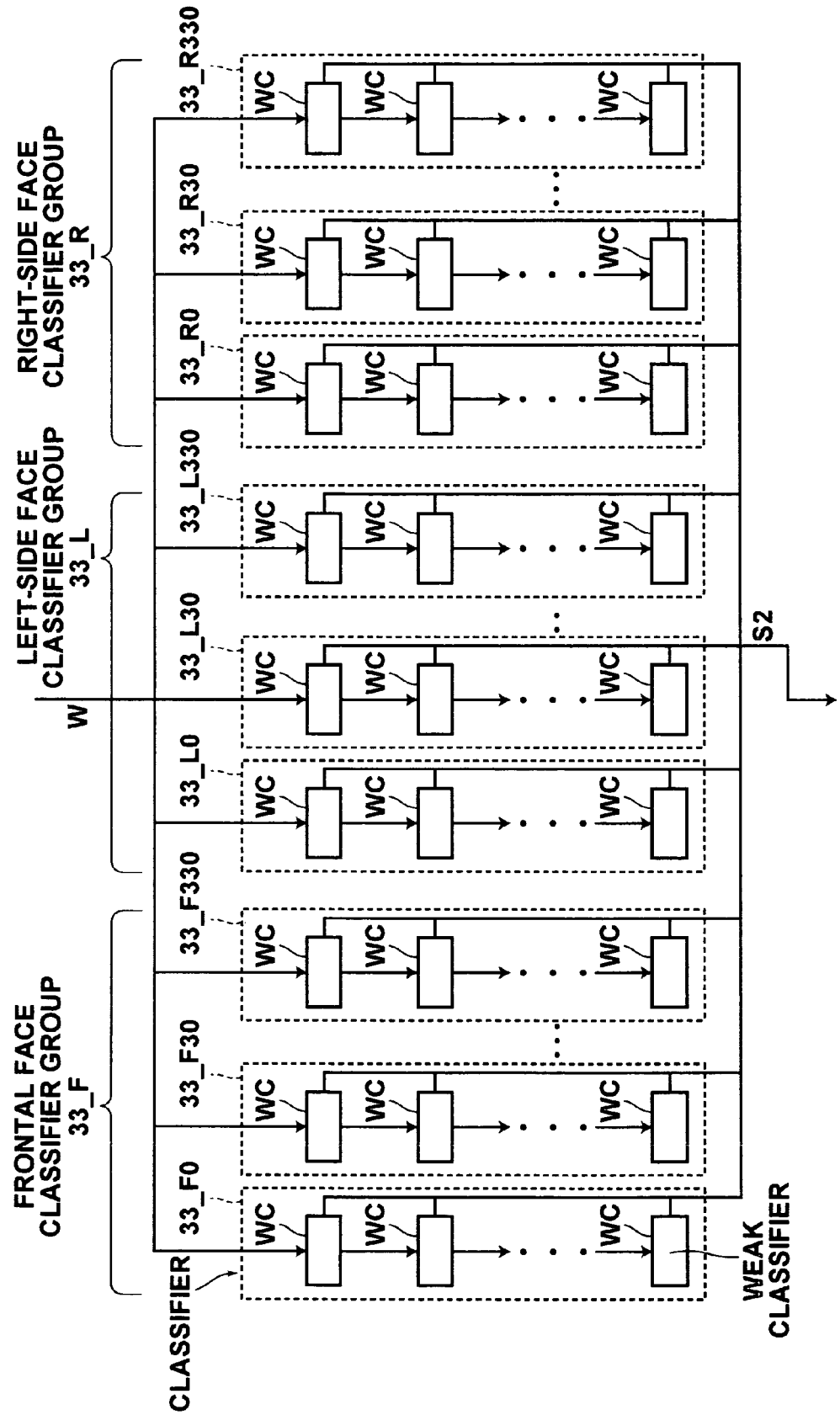
FIG. 6 is a block diagram illustrating the configuration of a classifier group.

FIG. 6 illustrates the configuration of the classifier group 33. As shown in FIG. 6, the classifier group 33 is formed by multiple types of classifier groups respectively corresponding to different orientations of the faces to be discriminated, i.e., a frontal face classifier group 33_F for mainly discriminating frontal faces, a left-side face classifier group 33_L for mainly discriminating left-side faces, and a right-side face classifier group 33_R for mainly discriminating right-side faces, which are connected in parallel. Further, each of the three types of classifier groups contains multiple classifiers. Each classifier can discriminate faces having an inclination corresponding to one of the twelve directions at intervals of 30 degrees from the vertical direction of the partial image. Namely, the frontal face classifier group 33_F includes classifiers 33_F0, 33_F30, . . . , and 33_F330, the left-side face classifier group 33_L includes classifiers 33_L0, 33_L30, . . . , and 33_L330, and the right-side face classifier group 33_R includes classifiers 33_R0, 33_R30, . . . , and 33_R330.

As shown in FIG. 6, each of the classifiers has a cascade structure in which multiple weak classifiers WC are coupled linearly. Each weak classifier WC calculates at least one feature quantity relating to a distribution of pixel (luminance) values of the partial image W, and the calculated feature quantity is used to discriminate whether or not the partial image W is a face image.

It should be noted that, although the main orientations of faces in the out-plane direction of the image, which can be discriminated by the classifier group 33, are the three orientations including the frontal face, the left-side face and the right-side face, the classifier group 33 may include additional classifiers that respectively discriminate right-front and left-front oriented faces to improve accuracy in detection of faces having such oblique orientations.

The overlapping detection determining unit 40 integrates images representing the same face, i.e., overlappingly detected face image candidates among the face image candidates detected in each of the resolution images of the resolution image group S1', into one face image candidate based on the positional information of the face image candidates S2 detected by the face candidate detection unit 30, and outputs face image candidates S3 detected in the inputted image S0 without overlap. This is because that, although it depends on the learning process, each classifier typically has a certain degree of an allowable range for the discriminable size of faces relative to the size of the partial image W, and therefore, images representing the same face may be detected overlappingly in the resolution images having adjacent resolution levels.

Now, the configuration of each classifier forming the classifier group 33, the flow of operations in the classifier and the learning process for the classifier will be described.

As shown in FIG. 6, each classifier contains multiple weak classifiers WC, which have been selected, through the later-described learning process, from a lot of weak classifiers WC as being effective for the discrimination and which are connected in series in the order of the effectiveness from the most effective one. Each weak classifier WC calculates a feature quantity from the partial image W according to a predetermined algorithm that is unique to the weak classifier WC, and obtains a score that indicates a probability of the partial image W being a face image containing a face having predetermined inclination and orientation, based on the feature quantity and a predetermined score table (a histogram of the weak classifier itself, which is described later). The classifier evaluates the scores obtained by all or some of the weak classifiers WC, and obtains a discrimination result R that indicates whether or not the partial image W is a face image having the predetermined inclination and orientation.

Figure 7:
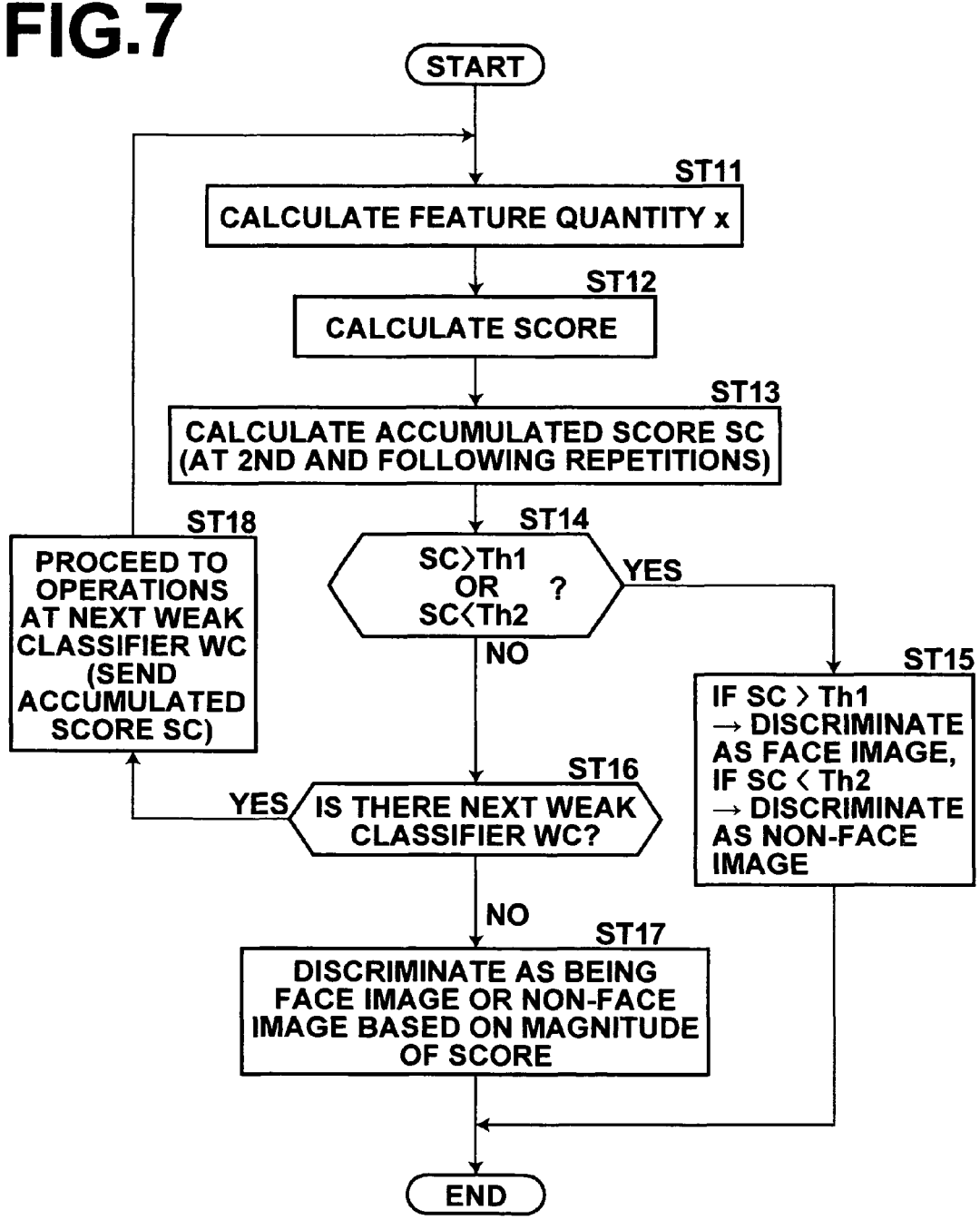
FIG. 7 is a flow chart of a process at a classifier.
Figure 8:
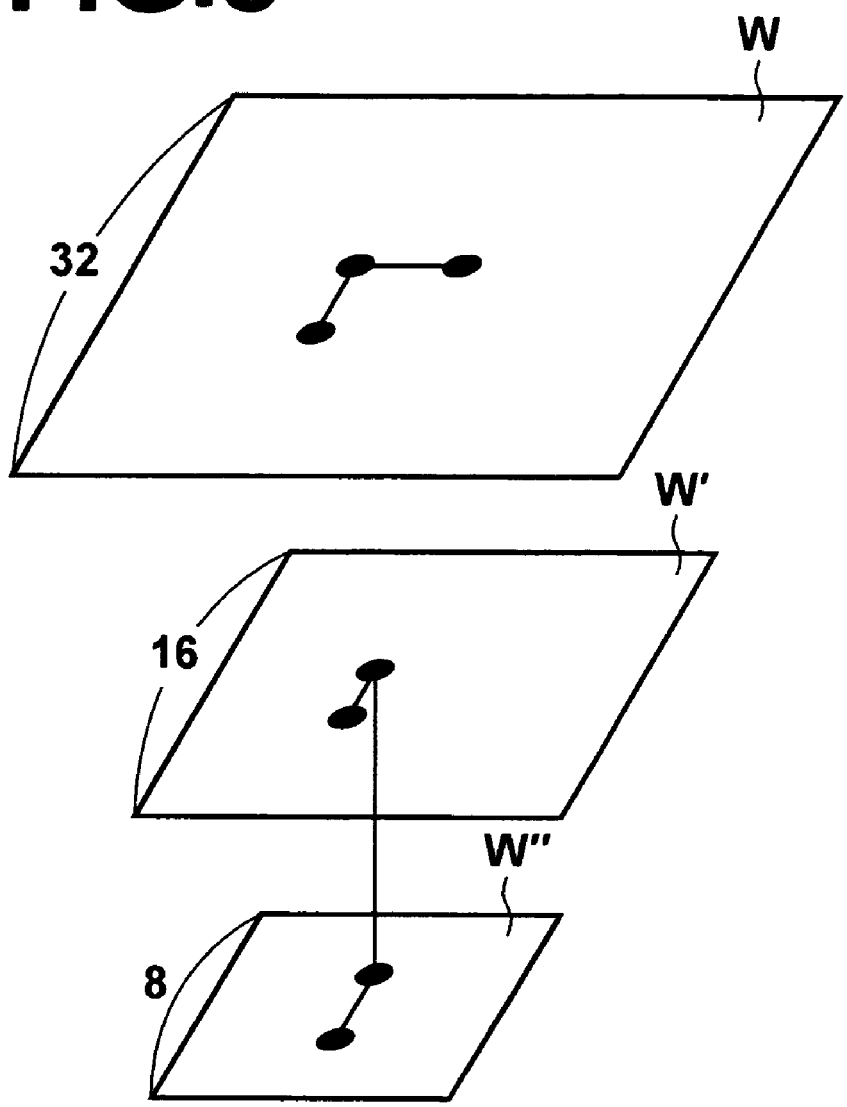
FIG. 8 is a diagram for explaining calculation of a feature quantity at a weak classifier.

FIG. 7 is a flow chart illustrating the flow of a process carried out at one classifier. As the partial image W is inputted to the classifier, the first weak classifier WC calculates a feature quantity x (step ST11). For example, as shown in FIG. 8, 4-neighbor pixel averaging (a process that divides an image into blocks each having a 2×2 pixel size, and assigns an average value of four pixels in each block to one pixel corresponding to the block as the pixel value thereof) is applied in a phased manner to the partial image W having the predetermined size (for example, 32×32 pixel size) to obtain an image W' having a reduced pixel size of 16×16 pixels and an image W" having a reduced pixel size of 8×8 pixels. Then, a group of pairs of predetermined points, which are set in the planes of these three images W, W' and W" is formed, and a difference between the pixel (luminance) values of the two points of each pair is calculated. A combination of these differences of the pairs forming the group is used as the feature quantity of the partial image. The predetermined two points of each pair may be, for example, predetermined two points along the longitudinal direction or the transverse direction of the image, which are determined to reflect the feature with respect to the contrasting density of the face in the image. Then, a value x corresponding to the combination of the differences is calculated as the feature quantity. Subsequently, the score, which indicates the probability of the partial image W being the image representing the face to be discriminated (for example, in the case of the classifier 33_F30, "a face having the frontal orientation and the inclination of the rotational angle of 30 degrees"), is obtained based on the value x and the predetermined score table (the histogram of the weak classifier itself) (step ST12) Subsequently, the score is added to the score received from the previous weak classifier WC to calculate an accumulated score SC. However, since the first weak classifier WC has no score to receive (no previous weak classifier WC), the score obtained by the first weak classifier WC is outputted as the accumulated score SC (step ST13). Then, whether or not the accumulated score SC exceeds a predetermined threshold value Th1, and whether or not the accumulated score SC does not reach a predetermined threshold value Th2 are determined (step ST14). That is, whether or not the accumulated score SC satisfies the condition SC>Th1 or the condition SC<Th2 is determined. If it is determined that the accumulated score SC satisfies these conditions, then, the partial image W is determined to be a "face image" representing the face to be discriminated when SC>Th1, or is determined to be a "non-face image" when SC<Th2, and the process ends (step ST15). On the other hand, if it is determined in step ST14 that the accumulated score SC does not satisfy the above conditions, then, whether or not there is a next weak classifier WC is determined (step ST16). If it is determined that there is a next weak classifier WC, then the accumulated score SC is sent to the next weak classifier WC and the process proceeds to the operations at the next weak classifier WC (step ST18). On the other hand, if it is determined in step ST16 that there is no next weak classifier WC, the partial image W is determined to be either a "face image" representing the face to be discriminated or a "non-face image" based on the magnitude of the calculated score (step ST17), and the process ends.

Next, a learning process for (or process of generating) the classifier is described.

Figure 9:
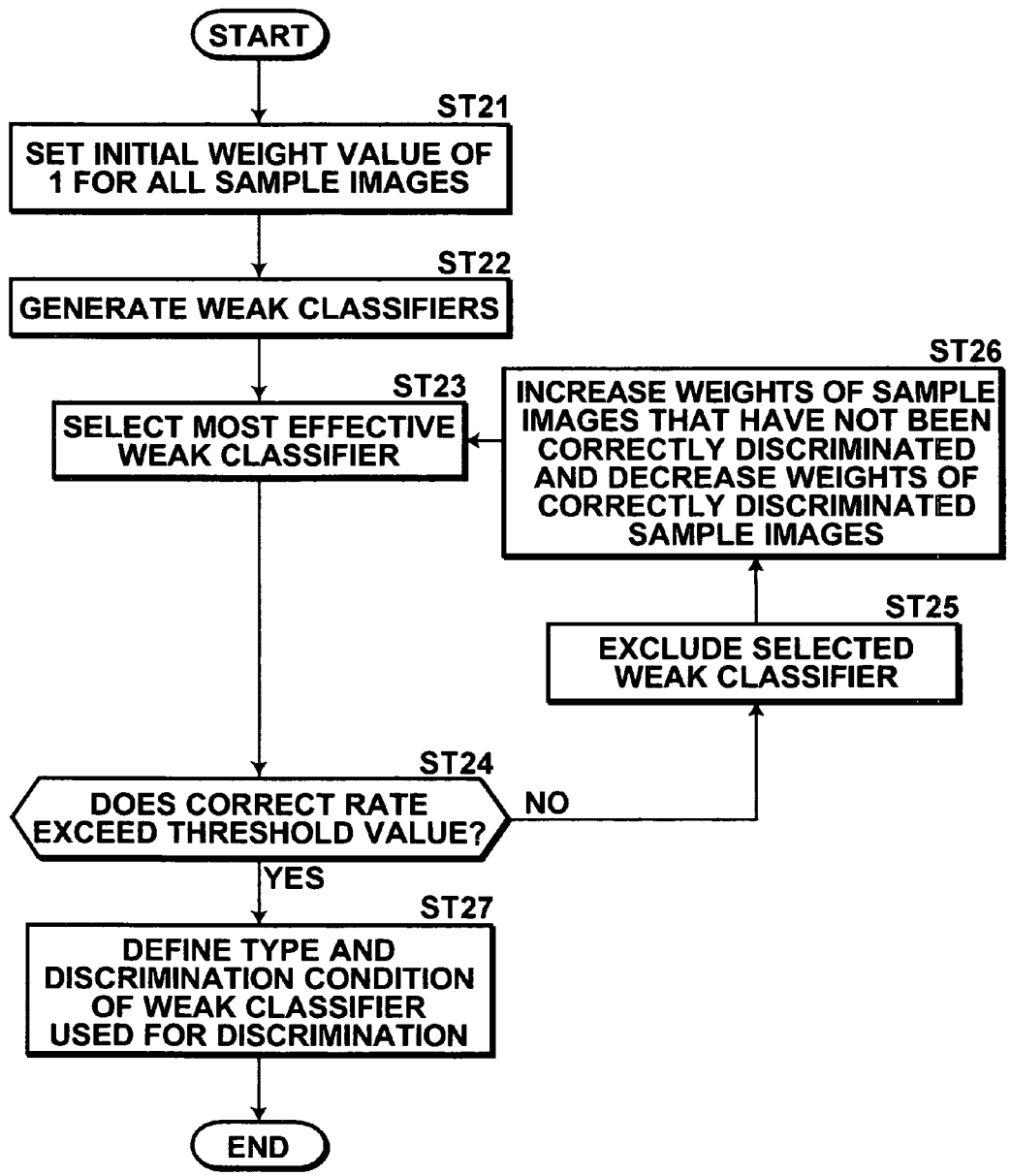
FIG. 9 is a flow chart of a learning process for the classifier.

FIG. 9 is a flow chart illustrating the learning process for the classifier. For the learning by the classifier, sample images are used, which have been standardized to have a predetermined size (for example, 32×32 pixel size) and further subjected to processing similar to the normalization processing by the normalization unit 20. As the sample images, a face sample image group formed by different face sample images which are known to be face images and a non-face sample image group formed by different non-face sample images which are known not to be face images are prepared.

Figure 10:
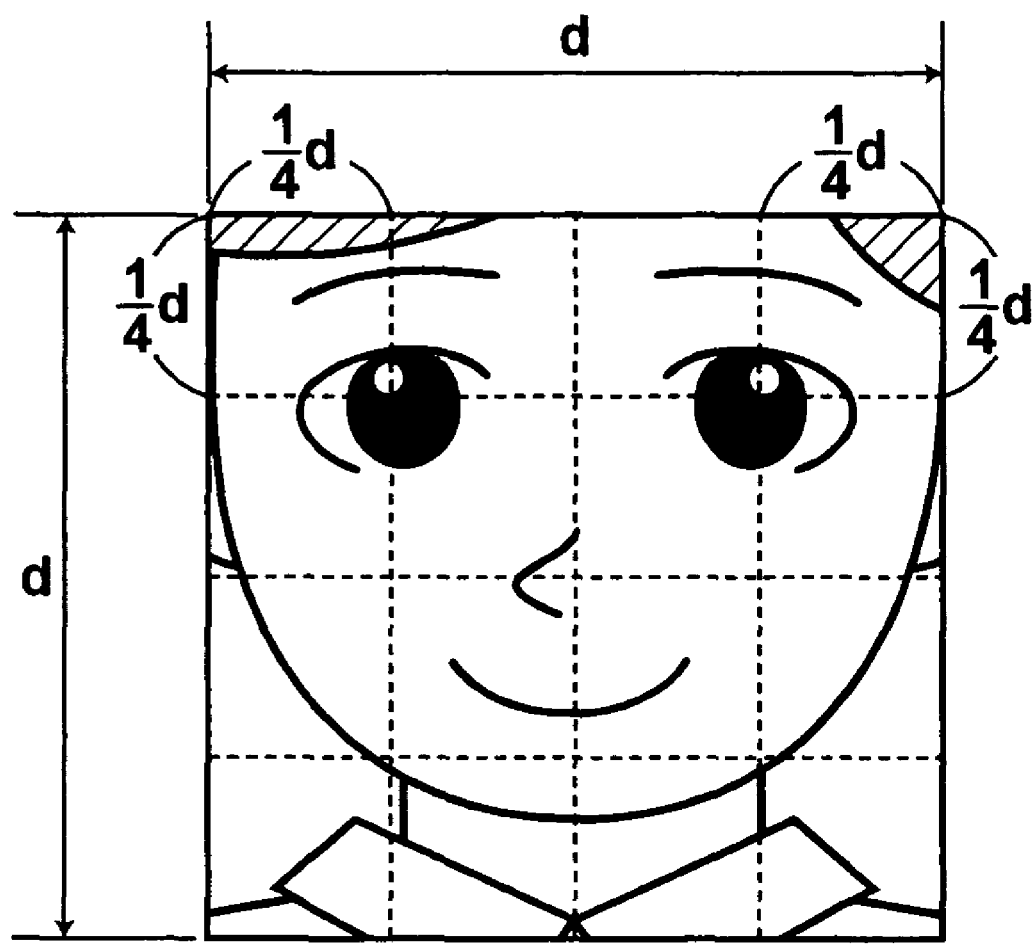
FIG. 10 illustrates a sample face image that has been standardized so that eyes are positioned at predetermined positions.

The face sample image group contains multiple variations of one face sample image, which are obtained by scaling the longitudinal and/or transverse dimensions of the face sample image in a phased manner within a range from 0.7 to 1.2 times by an increment (decrement) of 0.1, and then rotating the scaled sample images in a phased manner within a range of ±15 degrees on the image plane by an increment of three degrees. It should be noted that the sizes and the positions of the faces contained in the face sample images are standardized so that the eye (s) is positioned at a predetermined position (s). Then, the above-described rotation on the image plane and scaling are carried out with the position (s) of the eye (s) being the reference point. For example, in a case of a sample image having a d×d size, as shown in FIG. 10, the size and the position of the face is standardized so that the eyes are positioned at points inward by a distance of ¼ d and downward by a distance ¼ d from the upper left apex and the upper right apex of the sample image, respectively. The rotation on the image plane and scaling are carried out with the midpoint between the eyes being the center.

Each of these sample images is assigned with a weight, i.e., an importance. First, the initial weight value of 1 is assigned for all the sample images (step ST21).

Next, the groups of pairs of the predetermined points set within the planes of the sample image and the reduced images thereof are set, and a weak classifier is produced for each group of pairs (step ST22). Each weak classifier provides criteria for discrimination between the face image and the non-face image using a combination of differences between pixel (luminance) values of the two points in each pair forming the group of pairs of the predetermined points set in the planes of the partial image cut out within the sub-window W and reduced images thereof. In this embodiment, a histogram about the combination of differences between pixel values of the two points in each pair forming the group of pairs is used as a basis for the score table for the weak classifier.

Figure 11:
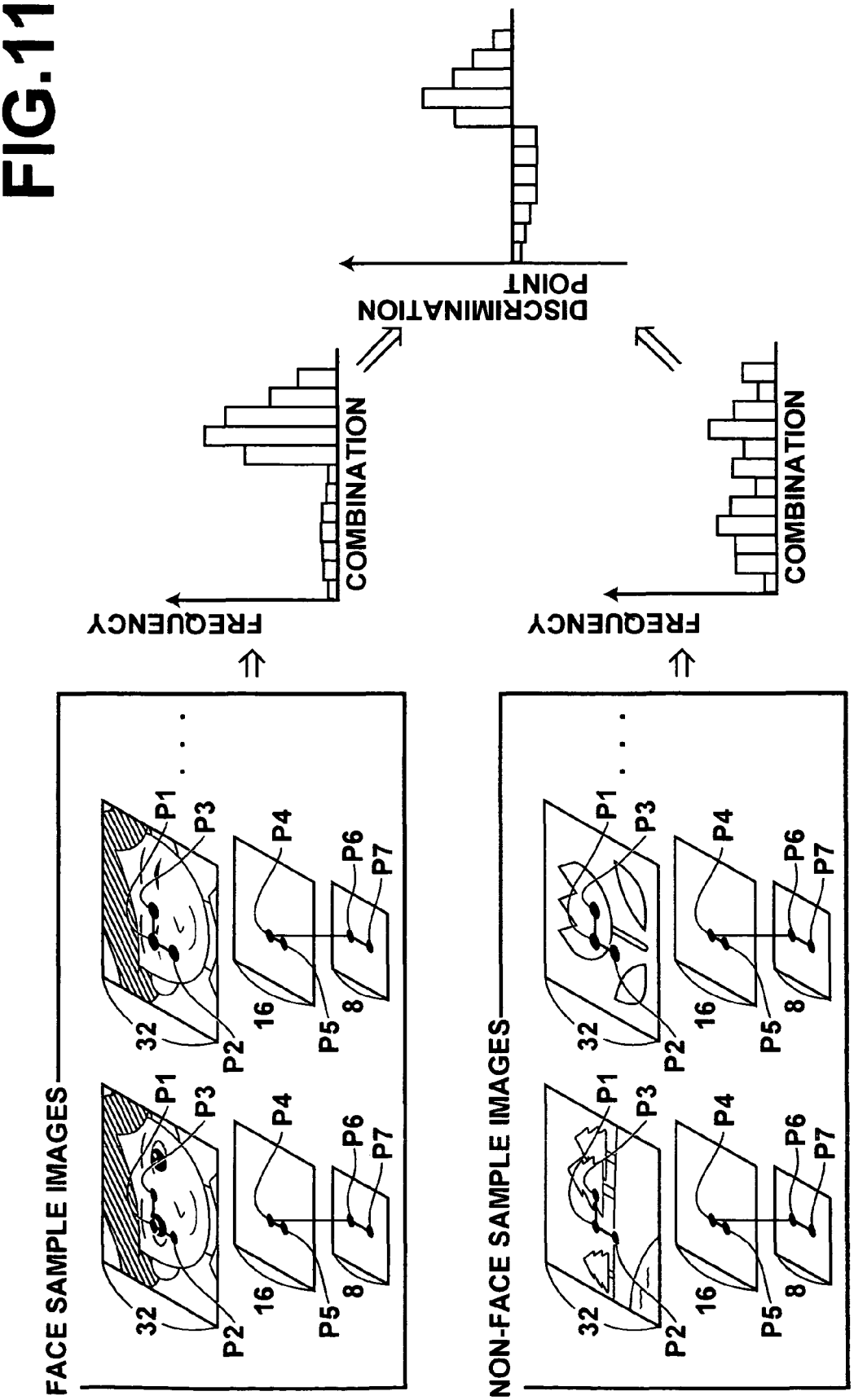
FIG. 11 illustrates how a histogram of the weak classifier is derived.

FIG. 11 illustrates how the histogram is generated from the sample images. As shown by the sample images on the left side of FIG. 11, the pairs of points forming the group of pairs for producing the classifier are five pairs of points P1 and P2, P1 and P3, P4 and P5, P4 and P6, and P6 and P7 in the face sample images. The point P1 is at the center of the right eye, the point P2 is at the right cheek and the point P3 is between the eyebrows in the sample image; the point P4 is at the center of the right eye and the point P5 is at the right cheek in the 16×16 pixel size reduced image obtained by reducing the sample image using the 4-neighbor pixel averaging; and the point P6 is at the forehead and the point P7 is at the mouth in the 8×8 pixel size reduced image obtained by reducing the 16×16 pixel size reduced image using the 4-neighbor pixel averaging. It should be noted that the coordinates of two points in each pair forming a group of pairs for producing a certain classifier are common to all the sample images. Then, for each of the face sample images, the combination of the differences between pixel values of the points of the respective pairs of the five pairs is obtained, and a histogram about the combination is generated. Note that values that may be taken as the combination of the differences between the pixel values vary depending on the number of levels in the luminance scale of the image. In the case of a 16 bit luminance scale, for example, there are 65,536 different values for a difference between a pair of pixel values, and therefore, as a whole (for the five pairs), the number of the values is "the number of levels in the scale" raised to the power of "the number of pairs", i.e. 65,536 raised to the power of 5. This would necessitate vast amounts of samples, time and memory for the learning and detection. Therefore, in this embodiment, the differences between the pixel values are quantized at intervals of a suitable numerical value to render them into n-values (n=100, for example). As a result, the number of the combinations of the differences between the pixel values becomes $n^5$, and thus the number of data representing the combination of the differences between the pixel values can be reduced.

Similarly, the histogram is generated for the non-face sample images that are known not to be a face. It should be noted that, for the non-face sample images, points P1 to P7 (designated by the same reference numerals) corresponding to the pairs of the predetermined points on the face sample images that are known to be faces are used. The histogram shown at the rightmost side of FIG. 11 plots logarithmic values of ratios of frequency values shown in these two histograms for the face and non-face sample image groups, and is used as the basis for the score table for the weak classifier. Hereinafter, the values along the vertical axis of the histogram of the weak classifier are referred to as discrimination points. According to this weak classifier, an image having a distribution of the combination of differences between pixel values corresponding to positive discrimination points has a high possibility of being a face, and the possibility is higher if the absolute values of the discrimination points are greater. In contrast, an image having a distribution of the combination of differences between pixel values corresponding to negative discrimination points has a high possibility of not being a face, and the possibility is higher if the absolute values of the discrimination points are greater. In step ST22, the weak classifier having a form of the above-described histogram is generated for each combination of the differences between the pixel values at the predetermined points in each pair forming the groups of pairs that may be used for discrimination.

Subsequently, from the weak classifiers generated in step ST22, a weak classifier which is the most effective for the discrimination as to whether or not the image is the face image is selected. The selection of the most effective weak classifier is carried out with consideration to the weight of each sample image. In this example, weighted correct rates of the weak classifiers are compared to each other, and a weak classifier showing the highest weighted correct rate is selected (step ST23). Namely, in the step ST23 for the first time, all the sample images have the same weight of 1, and therefore, simply, a weak classifier that has made correct discrimination on the highest number of sample images is selected as the most effective weak classifier. On the other hand, in step ST23 carried out for the second time after the weights of the sample images have been updated in the previous step ST26 (described later), there are sample images having the weight of 1, sample images having the weight greater than 1, and sample images having the weight less than 1 present in mixture. Therefore, in the evaluation of the correct rate, the sample images having the weight greater than 1 are counted-more than the sample images having the weight of 1. Thus, in step ST23 for the second time and later, the selection of the most effective weak classifier is carried out with a focus on that the weak classifier can correctly discriminate the sample images having large weights rather than the sample images having small weights.

Then, a correct rate of the combination of the weak classifiers selected so far (i.e., a rate of the results of the discrimination carried out by the combination of the weak classifiers selected so far corresponding to the actual correct answer) is found, and whether or not the correct rate exceeds a predetermined threshold value is checked (in the learning stage, the weak classifiers are not necessarily connected linearly) (step ST24). For the evaluation of the correct rate of the combination of the weak classifiers, the sample image groups with current weights or the sample image groups with equal weights may be used. If the correct rate exceeds the predetermined threshold value, then the discrimination of the image being the face image can be achieved with high probability using the weak classifiers selected so far, and therefore the learning process ends. If the correct rate does not exceed the predetermined threshold value, the process proceeds to step ST25 to select additional weak classifiers to be used in combination with the weak classifiers selected so far.

In step ST25, the weak classifier selected in the previous step ST23 are excluded so as not to be selected again.

Then, the weights of the sample images, which have not been correctly discriminated as to whether or not they are the face images by the weak classifier selected in the previous step ST23, are increased, and the weights of the sample images which have been correctly discriminated are decreased (step ST26). The reason for changing the weights in this manner is to put weight on the images which have not been correctly discriminated by the already selected weak classifier so that another weak classifier that can perform correct discrimination on these images is selected, thereby improving effect of combining the weak classifiers.

Then, the process returns to step ST23, where the next effective weak classifier is selected based on the weighted correct rate, as described above.

The above-described steps ST23 to ST26 are repeated. When a weak classifier corresponding to the combination of the differences between the pixel values of the predetermined points in the respective pairs forming a certain group of pairs has been selected as the weak classifier suitable for the discrimination of the face images, and if the correct rate checked in step ST24 has exceeded the threshold value, then the type and the discrimination condition of the weak classifier used for the discrimination are defined (step ST27), and the learning process ends. The selected weak classifiers are coupled linearly in the order of the weighted correct rates from the highest to the lowest to form one classifier. For each weak classifier, a score table for calculating a score according to the combination of the differences between the pixel values is generated based on the obtained histogram. It should be noted that the histogram itself can be used as the score table, and in this case, the discrimination points in the histogram are used as the scores.

In this manner, the classifier is generated through the learning process using the face sample image group and the non-face sample image group. As described above, in order to generate different classifiers corresponding to different inclinations and orientations of the faces to be discriminated, face sample image groups corresponding to the respective inclinations and orientations of faces are prepared, and the learning process is carried out for each face sample image group using the face sample image group and the non-face sample image group.

Namely, in this embodiment, three types of orientations including frontal, left side and right side orientations, and twelve types of inclinations including rotational angles from 0 degree to 330 degrees at intervals of 30 degrees are defined for faces, and therefore a total of 36 types of face sample image groups are prepared.

As the face sample image groups have been prepared, the above-described learning process is carried out for each type of the face sample image group using the face sample image group and the non-face sample image group, thereby generating the classifiers forming the classifier group 33.

Using the multiple classifiers, each of which has learned the corresponding orientation and inclination of the face, face images containing various inclinations and orientations of faces can be discriminated.

It should be noted that, when the above-described learning process is employed, the weak classifier may be in any form other than the histogram as long as it provides criteria for discrimination between the face images and the non-face images using the combination of differences between the pixel values of the predetermined points in the pairs forming a specific group of pairs, such as a form of binary data, a threshold value or a function. Further, the weak classifier may be in a form of a histogram showing the distribution of the differences between the two histograms shown at the center of FIG. 11.

The learning process is not limited to the above-described process, and other machine learning techniques such as a neural network may be used.

The discriminating unit 50 references, for each face image candidate, the score SC of the face image candidate obtained when the candidate is detected, and if the score SC is not less than a threshold value Th3 that is greater than the threshold value Th2, then the candidate is discriminated as being a true face image. On the other hand, if the score SC is less than the threshold value Th3, the discriminating unit 50 carries out the following process.

The discriminating-unit 50 obtains the inclination of the face of the face image candidate of interest, and checks if there is another face image candidate having the same inclination of the face. If the number of candidates having the same inclination of the face, including the face image candidate of interest, is two or more, the face image candidate of interest is discriminated as being a true face image.

It should be noted that the score SC of the integrated face image candidate, which has been obtained by integrating the overlapping face image candidates by the overlapping detection determining unit 40, is the highest score of the scores of the face image candidates before integrated.

In this embodiment, the face candidate detection unit 30 and the overlapping detection determining unit 40 serve as the face image candidate extracting means of the invention, and the discriminating unit 50 serves as the discriminating means of the invention.

Next, the flow of the process carried out in the face detection system 1 will be described. The process carried out in the face detection system is generally divided into a face candidate detecting process and a true face detecting process.

Figure 12:
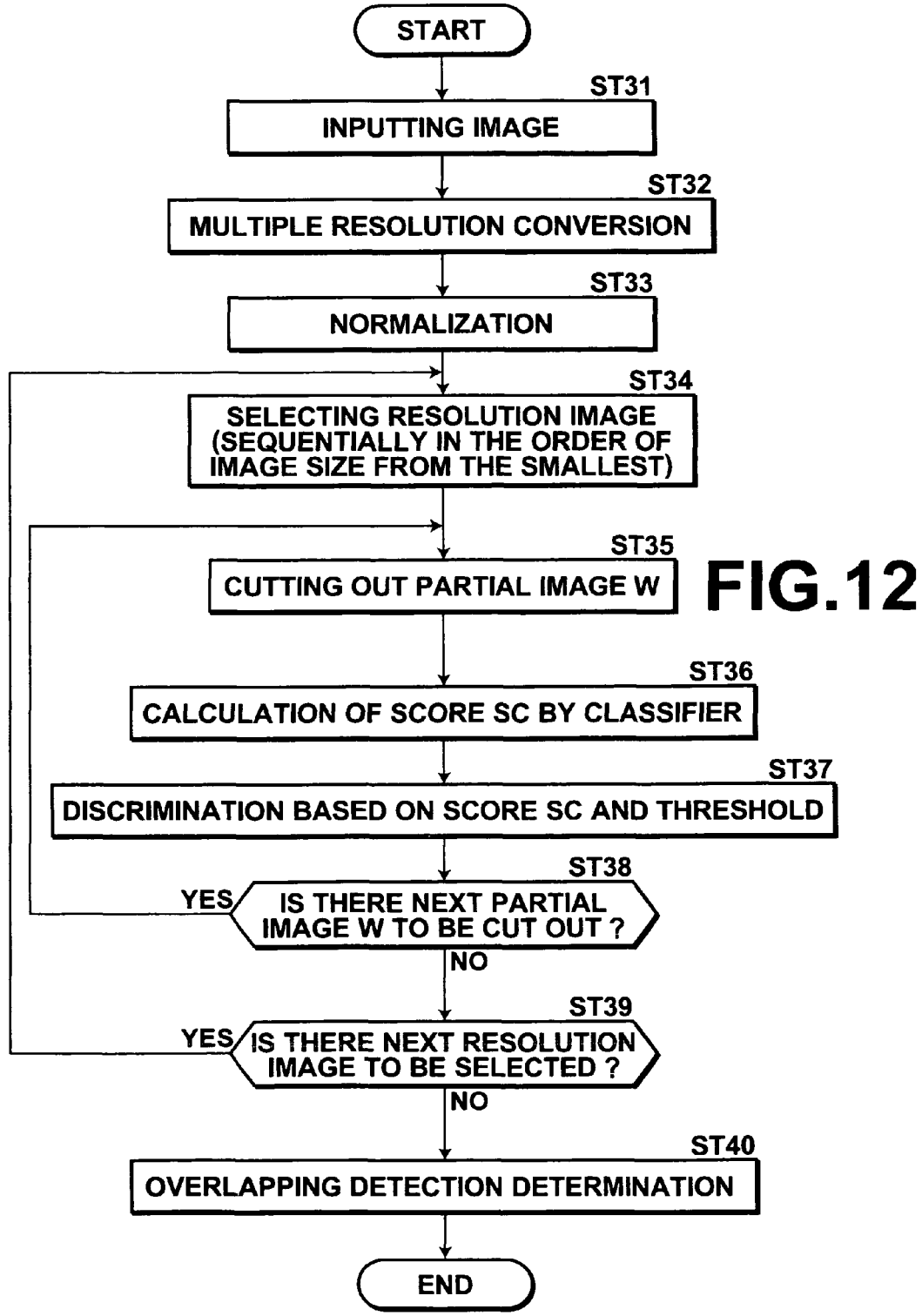
FIG. 12 is a flow chart of a face candidate detecting process carried out in the face detection system.
Figure 13:
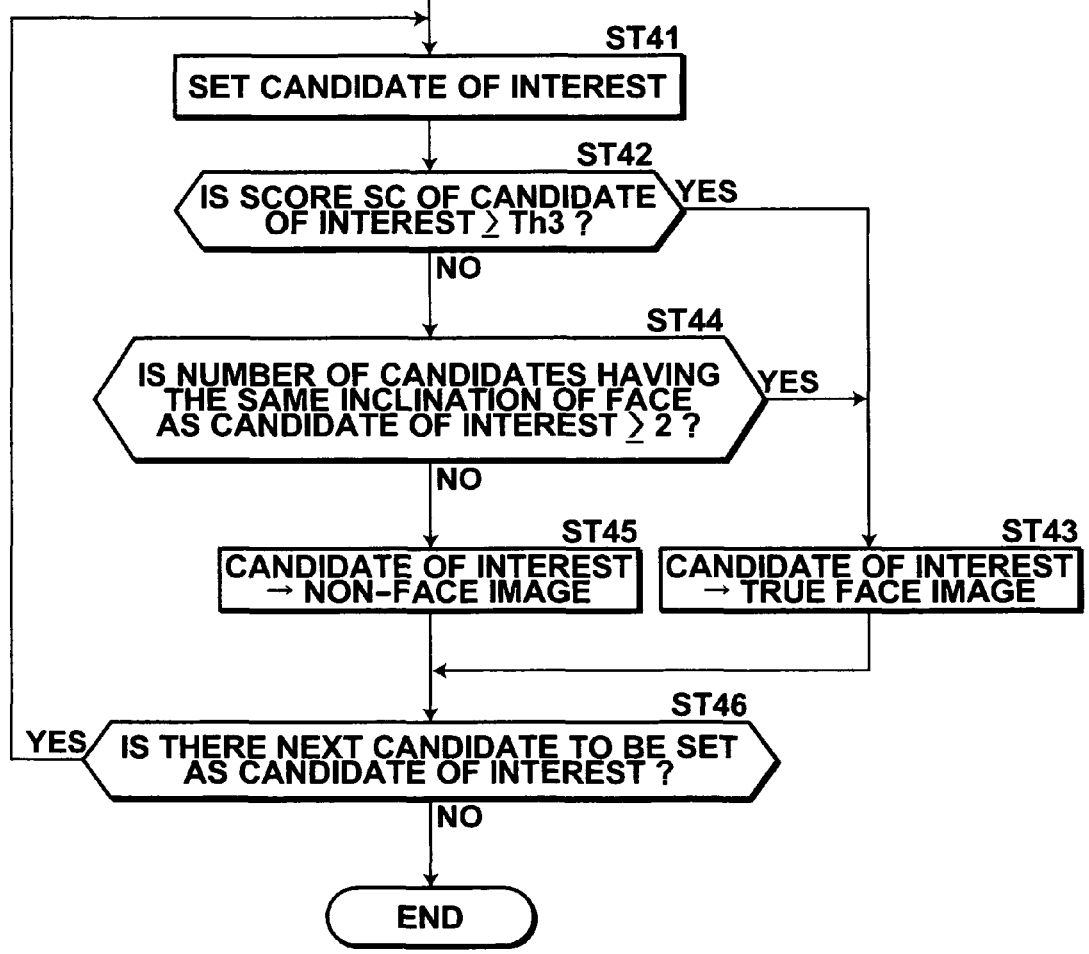
FIG. 13 is a flow chart of a true face detecting process carried out in the face detection system.

FIG. 12 is a flow chart illustrating the flow of the face candidate detecting process, and FIG. 13 is a flow chart illustrating the flow of the true face detecting process.

First, the face candidate detecting process is described. As the inputted image S0 is supplied to the multiple resolution image generating unit 10 (step ST31), the image S0' is generated by converting the image size of the inputted image S0 into a predetermined size, and further the resolution images forming the resolution image group S1 are generated by reducing the size (resolution) of the image S0' by a decrement of $2^{-1/3}$ times, and repeating this size reduction on the reduced image obtained by the previous size reduction (step ST32). Then, the normalization unit 20 applies the above-described global normalization processing and local normalization processing to the resolution images of the resolution image group S1 to obtain the normalized resolution image group S1' (step ST33). Subsequently, the resolution image selection unit 31 within the face candidate detection unit 30 selects one of the resolution images S1'_i of the resolution image group S1' in the order of the image size from the smallest, i.e., in the order of S1'_n, S1'_n−1, . . . , and S1'_1 (step ST34). The sub-window setting unit 32 sets the sub-window on the selected resolution image S1'_i, to cut out the partial image W having a predetermined size (step ST35), and inputs the partial image W to the classifier group 33. Each classifier forming the classifier group 33 calculates the score SC that indicates a probability of the partial image W being the face image containing a face having the predetermined inclination and orientation (step ST36). If the score SC is not less than the threshold value Th2, then the partial image W is determined to be a face image containing a face having the predetermined inclination and orientation. On the other hand, if the score SC is less than the threshold value Th2, the partial image W is determined not to be a face image (step ST37). When the partial image W has been determined to be a face image, the partial image W is sent to the overlapping detection determining unit 40 as a face image candidate S2. Then, the sub-window setting unit 32 determines whether or not there is a next partial image W to be cut out (step ST38). If there is a next partial image W to be cut out, then the process returns to step ST35, where a new sub-window is set by shifting the position of the previous sub-window by one pixel, and a new partial image W is cut out. On the other hand, if there is no next partial image W to be cut out, the resolution image selection unit 31 determines whether or not there is a next resolution image to be selected (step ST39). If there is a next resolution image to be selected, then the process returns to step ST34, where a new resolution image having an image size that is one level smaller than the size of the previously selected resolution image is selected. On the other hand, if there is no next resolution image to be selected, the overlapping detection determining unit 40 integrates the overlappingly detected face image candidates representing the same face into one candidate based on the positional information of the detected face image candidates, and sends face image candidates S3 without overlap to the discriminating unit 50 (step ST40), and the face candidate detecting process ends.

Next, the true face detecting process is described. The discriminating unit 50 sets one of the detected face image candidates S3 as a candidate of interest (step ST41), and determines whether or not the score SC obtained when the candidate of interest is detected is not less than the threshold value Th3 (step ST42). If it is determined that the score SC is not less than the threshold value Th3, the candidate of interest is determined to be a true face image (step ST43). On the other hand, if the score SC is less than the threshold value Th3, determination is made as to whether or not the number of candidates having the same inclination of the face as the candidate of interest, including the candidate of interest, is two or more (step ST44). If it is determined that the number of candidates is two or more, the candidate of interest is determined to be a true face image (step ST43). On the other hand if the number of candidates is less than two, the candidate of interest is determined not to be a true face image (step ST45). Then, determination is made as to whether or not there is a next face image candidate to be set as a candidate of interest (step ST46). If there is a next candidate to be set, the process returns to step ST41 to continue the operations. On the other hand, if there is no candidate to be set, true face images S4 are outputted and the true face detecting process ends.

Figure 14:
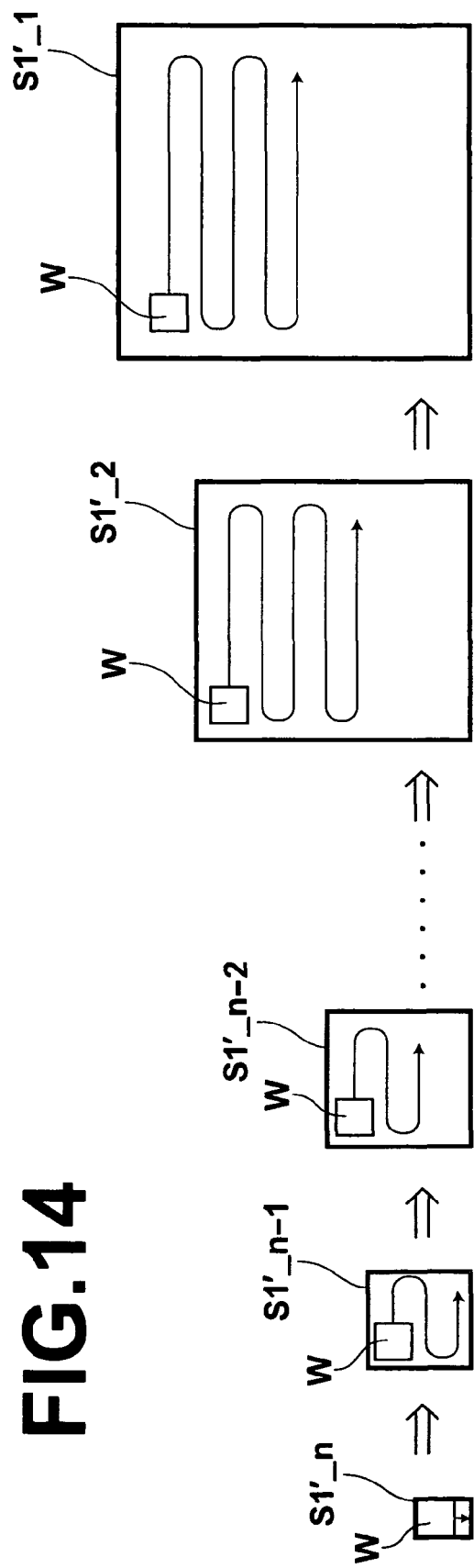
FIG. 14 is a diagram for explaining switching of resolution images subject to face detection and shifting of a sub-window on the images.

FIG. 14 shows how the resolution images are selected in the order of the size from the smallest and the partial images W are sequentially cut out from the respective resolution images by repeating the steps ST34 to ST39 to carry out the face candidate detection.

Figure 15:
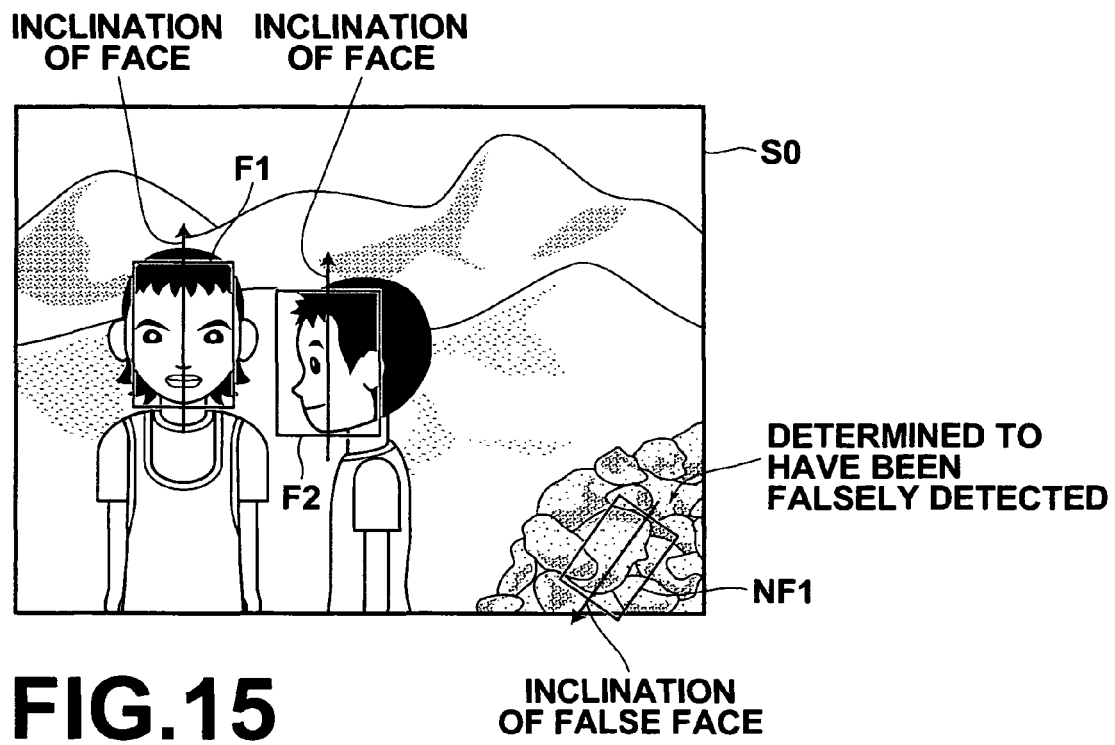
FIG. 15 illustrates one example of an inputted image reflecting results of face image detection by the face detection system.

FIG. 15 illustrates one example of the inputted image S0 that reflects the results of the face image detection by the face detection system 1. The inputted image S0 shown in FIG. 15 is a photographic image containing a frontal face image F1 and a left-side face image F2, which are human face images, and a background image, which contains a non-face image NF1 that resembles to a left-side face. In this inputted image S0, the frontal face image F1 and the left-side face image F2 have the same inclination of the face, which is along the vertical direction of the inputted image S0, however, the false face appearing in the non-face image NF1 has a different inclination. Further, the score calculated for the frontal face image F1 is not less than the threshold value Th3 for acceptance, and the scores calculated for the left-side face image F2 and the non-face image NF1 are not less than the threshold value Th2 and less than the threshold value Th3. That is, although the left-side face image F2 and the non-face image NF1 have been detected as the candidates, they are not accepted as true face images without further evidence. According to the face detection system 1, which is the embodiment of the invention, since the inclination of the face of the left-side face image F2 is the same as that of the frontal face image F1, there are two face image candidates having the same inclination. Thus, the left-side face image F2 is detected as a face image. On the other hand, since the inclination of the false face in the non-face image NF1 is different from that of the frontal face image F1, the non-face image NF1 is determined to have been falsely detected and is not detected as a face image.

As described above, according to the face detection system of the present embodiment, when a candidate having a certain inclination of the face is detected in an inputted image, and the number of candidates having the same inclination of face in the inputted image, which serves as a predetermined evaluation value indicating reliability of the candidate, exceeds a certain threshold value, another candidate having the same inclination of the face as the first candidate is accepted as a true face, or the threshold value for determining whether or not the other candidate should be accepted as a true face is lowered. Thus, utilizing the fact that faces contained in the same image often have substantially the same inclination, tendency of accepting candidates having low possibility of false detection as true faces can be enhanced, thereby reducing false detection of faces.

For example, in photographic images taken with a digital camera, multiple subjects in an image have the same vertical direction, and therefore, even when images are taken with the camera being tilted, besides being horizontal or vertical, with respect to the subjects, the subjects in the obtained photographic image often have substantially the same vertical direction. In other words, when the subjects are in natural standing or sitting postures, the inclinations of the faces in the same image tend to be substantially the same regardless of the respective faces being a frontal face or a side face. Therefore, by accepting faces having the same inclination as true faces as in the invention, false detection can be reduced.

It should be noted that, although the discriminating unit 50 in the present embodiment discriminates the face image candidate of interest having the score SC less than the predetermined threshold value Th3 as being a true face image when the number of face image candidates, including the face image candidate of interest, having the same inclination of the face is two or more, the following method may be used alternatively.

The inclination of the face of a certain face image candidate of interest is found, and if there is another face image candidate having the same inclination of the face is checked. Then, if a total sum of the scores SC for the face candidates having the same inclination, including the face image candidate of interest, is not less than a predetermined threshold value Th4, the face image candidate of interest is discriminated as being a true face image.

Further, the number of candidates or the total sum of scores may be calculated in a weighted manner. For example, since reliability of side faces is lower than that of frontal faces, the number of candidates may be calculated as "the number of frontal face candidates"+"the number of side face candidates"×0.5, and the total sum of scores may be calculated as "scores of frontal face candidates"+"scores of side face candidates"×0.5.

Furthermore, an integrated score may be calculated based on the number of candidates and the total sum of scores, and if the integrated score is not less than a predetermined threshold value, the candidates may be accepted as true face images or the threshold value Th3 for acceptance may be lowered.

In addition, the discriminating unit 50 may compare frontal face candidates and side face candidates of detected face image candidates S3, and may discriminate only the side face candidates having substantially the same inclination as the frontal face candidates, i.e., an inclination within a predetermined range, for example, a range of rotational angles of ±30 degrees, from the inclination of the frontal face candidates, as being true face images, and exclude the other side face candidates as being falsely detected, and then, output the remaining frontal face candidates and the side face candidates as true face images.

The face detection system according to one embodiment of the invention has been described. Embodiments of the invention further includes a program for causing a computer to carry out the processes carried out in the face detection system. In addition, embodiments of the invention includes a computer readable storage medium that stores the program.

According to the face detection method, device and program of the invention, when a candidate having a certain inclination of the face is detected in an inputted image, and a predetermined evaluation value indicating reliability of the candidate exceeds a certain threshold value, another candidate having the same inclination of the face as the candidate is accepted as a true face, or a threshold value for determining whether or not the other candidate should be accepted as a true face is lowered. Thus, utilizing the fact that faces contained in the same image often have substantially the same inclination, tendency of accepting candidates having low possibilities of false detection as true faces can be enhanced, thereby reducing false detection of faces.

What is claimed is:

1. A face detection method comprising:
a face candidate extracting step for extracting face image candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and a discriminating step for discriminating whether or not the face image candidates are true face images, wherein, when a predetermined evaluation value indicating reliability of a certain face image candidate, among the face image candidates, having a predetermined inclination and a first orientation of the face is not less than a predetermined threshold value, the discriminating step discriminates another face image candidate, among the face image candidates, having substantially the same inclination as the predetermined inclination and a second orientation of the face as being a true face image.

2. The face detection method as claimed in claim 1, wherein the evaluation value is a number of the face image candidates having the first orientation of the face, and the predetermined threshold value is an integer of 2 or more.

3. The face detection method as claimed in claim 1, wherein the evaluation value is a total sum of the indicator values of the face image candidates having the first orientation of the face.

4. The face detection method as claimed in claim 1, wherein the first orientation and the second orientation are the same orientation.

5. The face detection method as claimed in claim 4, wherein the first and second orientations comprise a plurality of different orientations.

6. The face detection method as claimed in claim 1, wherein the first orientation is a front orientation and the second orientation is a side or oblique orientation.

7. A face detection method comprising:

a face candidate extracting step for extracting face candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and a discriminating step for discriminating whether or not the face image candidates are true face images, wherein the discriminating step discriminates the face image candidates having the calculated indicator values not less than a second threshold value as being true face images from all the other extracted face image candidates, and when a predetermined evaluation value indicating reliability of a certain face image candidate, among the face image candidates, having a predetermined inclination and a first orientation of the face is not less than a predetermined threshold value, the discriminating step lowers the second threshold value for discrimination of another face image candidate, among the face image candidates, having substantially the same inclination as the predetermined inclination and a second orientation of the face.

8. The face detection method as claimed in claim 7, wherein the evaluation value is a number of the face image candidates having the first orientation of the face, and the predetermined threshold value is an integer of 2 or more.

9. The face detection method as claimed in claim 7, wherein the evaluation value is a total sum of the indicator values of the face image candidates having the first orientation of the face.

10. The face detection method as claimed in claim 7, wherein the first orientation and the second orientation are the same orientation.

11. The face detection method as claimed in claim 10, wherein the first and second orientations comprise a plurality of different orientations.

12. The face detection method as claimed in claim 7, wherein the first orientation is a front orientation and the second orientation is a side or oblique orientation.

13. A face detection device comprising:

a face candidate extracting means for extracting face image candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and a discriminating means for discriminating whether or not the face image candidates are true face images, wherein, when a predetermined evaluation value indicating reliability of a certain face image candidate, among the face image candidates, having a predetermined inclination and a first orientation of the face is not less than a predetermined threshold value, the discriminating means discriminates another face image candidate, among the face image candidates, having substantially the same inclination as the predetermined inclination and a second orientation of the face as being a true face image.

14. The face detection device as claimed in claim 13, wherein the evaluation value is a number of the face image candidates having the first orientation of the face, and the predetermined threshold value is an integer of 2 or more.

15. The face detection device as claimed in claim 13, wherein the evaluation value is a total sum of the indicator values of the face image candidates having the first orientation of the face.

16. The face detection device as claimed in claim 13, wherein the first orientation and the second orientation are the same orientation.

17. The face detection device as claimed in claim 16, wherein the first and second orientations comprise a plurality of different orientations.

18. The face detection device as claimed in claim 13, wherein the first orientation is a front orientation and the second orientation is a side or oblique orientation.

19. A face detection device comprising:

a face candidate extracting means for extracting face image candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and a discriminating means for discriminating whether or not the face image candidates are true face images, wherein the discriminating means discriminates the face image candidates having the calculated indicator values not less than a second threshold value as being true face images from all the other extracted face image candidates, and when a predetermined evaluation value indicating reliability of a certain face image candidate, among the face image candidates, having a predetermined inclination and a first orientation of the face is not less than a predetermined threshold value, the discriminating means lowers the second threshold value for discrimination of another face image candidate, among the face image candidates, having substantially the same inclination as the predetermined inclination and a second orientation of the face.

20. The face detection device as claimed in claim 19, wherein the evaluation value is a number of the face image candidates having the first orientation of the face, and the predetermined threshold value is an integer of 2 or more.

21. The face detection device as claimed in claim 19, wherein the evaluation value is a total sum of the indicator values of the face image candidates having the first orientation of the face.

22. The face detection device as claimed in claim 19, wherein the first orientation and the second orientation are the same orientation.

23. The face detection device as claimed in claim 22, wherein the first and second orientations comprise a plurality of different orientations.

24. The face detection device as claimed in claim 19, wherein the first orientation is a front orientation and the second orientation is a side or oblique orientation.

25. A non-transitory computer readable medium having stored thereon a program for causing a computer to operate as a face detection device by causing the computer to execute the steps of:
   a face candidate extracting means for extracting face image candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and
   a discriminating means for discriminating whether or not the face image candidates are true face images,
   wherein, when a predetermined evaluation value indicating reliability of a certain face image candidate, among the face image candidates, having a predetermined inclination and a first orientation of the face is not less than a predetermined threshold value, the discriminating means discriminates another face image candidate, among the face image candidates, having substantially the same inclination as the predetermined inclination and a second orientation of the face as being a true face image.

26. A non-transitory computer readable medium having stored thereon a program for causing a computer to operate as a face detection device by causing the computer to execute the steps of:
   a face candidate extracting means for extracting face image candidates by changing position, inclination and orientation of a face to be detected in an inputted image, calculating, for each of the position, inclination and orientation of the face to be detected, an indicator value indicating a probability of a partial image at the position being a face image containing a face having the inclination and the orientation, and extracting all the partial images having the indicator values not less than a first threshold value as face image candidates; and
   a discriminating means for discriminating whether or not the face image candidates are true face images,
   wherein the discriminating means discriminates the face image candidates having the calculated indicator values not less than a second threshold value as being true face images from all the other extracted face image candidates, and
   when a predetermined evaluation value indicating reliability of a certain face image candidate, among the face image candidates, having a predetermined inclination and a first orientation of the face is not less than a predetermined threshold value, the discriminating means lowers the second threshold value for discrimination of another face image candidate, among the face image candidates, having substantially the same inclination as the predetermined inclination and a second orientation of the face.

* * * * *